United States Patent
Ito et al.

(10) Patent No.: US 6,941,363 B2
(45) Date of Patent: Sep. 6, 2005

(54) TRANSACTION MANAGEMENT SYSTEM AND PROGRAM FOR CONFIGURING ONLINE SHOPPING SYSTEM

(75) Inventors: Hirokazu Ito, Kawasaki (JP); Naohito Takae, Kawasaki (JP); Hiroyuki Tani, Obihiro (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 09/864,171

(22) Filed: May 25, 2001

(65) Prior Publication Data

US 2001/0047489 A1 Nov. 29, 2001

(30) Foreign Application Priority Data

May 26, 2000 (JP) ........................................ 2000-157179

(51) Int. Cl.$^7$ ............................................. G06F 15/173
(52) U.S. Cl. ...................... 709/223; 709/224; 709/229; 705/30; 379/114; 379/119
(58) Field of Search ................................ 709/223–229; 379/114, 119; 705/30

(56) References Cited

U.S. PATENT DOCUMENTS 5,815,665 A * 9/1998 Teper et al. ................ 709/229
6,629,081 B1 * 9/2003 Cornelius et al. ........... 705/30
2001/0034677 A1 * 10/2001 Farhat et al. ............... 705/30

OTHER PUBLICATIONS

Internet commerce for small business, Chang–tseh Hsieh and Binshan Lin, Industrial Management and Data Systems, v98n3 pp 113–119, 1998.*

* cited by examiner

Primary Examiner—Richard Chilcot
(74) Attorney, Agent, or Firm—Staas & Halsey LLP

(57) ABSTRACT

Disclosed is a transaction management system for configurating on-line shopping system. The on-line shopping system including transaction management system also includes IPS-RADIUS server, account management system operated by carrier, article supplier server. The transaction management system has contract DB storing plural sets of contract information each consisting of a user ID, a customer code, an ISP code, an accounted party code specifying carrier (or account management system), and so on. When a customer buy an article by accessing to an article supplier server, the server transmit accounting process request containing customer code to the transaction management system. The transaction management system, when receiving the accounting process request, attempts to authenticate the identity of the customer. If the customer is authenticated, the transaction management system functions so that the carrier collects fee of bought article together with a fee charged for the service provided by the carrier.

6 Claims, 17 Drawing Sheets

FIG. 4

| ARTICLE CODE | A012012 | A012013 | | |
|---|---|---|---|---|
| ARTICLE STANDARD NAME | CONTENT A | WATCH A23 | | |
| MINIMUM PRICE | 0003000 | 0018000 | | |
| MAXIMUM PRICE | 0015000 | 0018000 | | |
| ARTICLE CLASSIFICATION | R012 | M010 | | |
| ARTICLE SUPPLIER CODE | BB1205 | BB1204 | | |
| RETURN DESTINATION ADDRESS | 102.5.1.3 | 102.5.2.1 | | |

| ARTICLE CLASSIFICATION | A010 | R010 | R012 | |
|---|---|---|---|---|
| ARTICLE CLASSIFICATION ADDED ITEM COUNT | 0 | 1 | 2 | |

| LOWER LIMIT PRICE | 0 | 3001 | 6001 | |
|---|---|---|---|---|
| UPPER LIMIT PRICE | 3000 | 6000 | 15000 | |
| PRICE ZONE ADDED ITEM COUNT | 0 | 1 | 2 | |

| | | | 24 |
|---|---|---|---|
| ACCOUNTED PARTY CODE | B001 | B010 | |
| ITEM SPECIFYING INFORMATION 1 | ZIP CODE | ZIP CODE 3-2 | |
| ITEM SPECIFYING INFORMATION 2 | NAME OF ADMINI-STRATIVE DIVISION | ZIP CODE 5-3 | |
| ITEM SPECIFYING INFORMATION 3 | NAME OF CITY | ADDRESS | |
| ITEM SPECIFYING INFORMATION 4 | ADDRESS | NAME OF CUSTOMER | |
| ⋮ | ⋮ | ⋮ | |

FIG. 8

| | | | | 25 |
|---|---|---|---|---|
| USER ID | a012012 | a012012 | a985634 | |
| CUSTOMER CODE | K351203 | X6568762 | K351204 | |
| ISP CODE | ISP-A | ISP-A | ISP-B | |
| ACCOUNTED PARTY CODE | S-010 | S-120 | S-010 | |
| PURCHASE RESTRAINT CONDITION SETTING PW | rmiapai | rmiapai | kioath | |

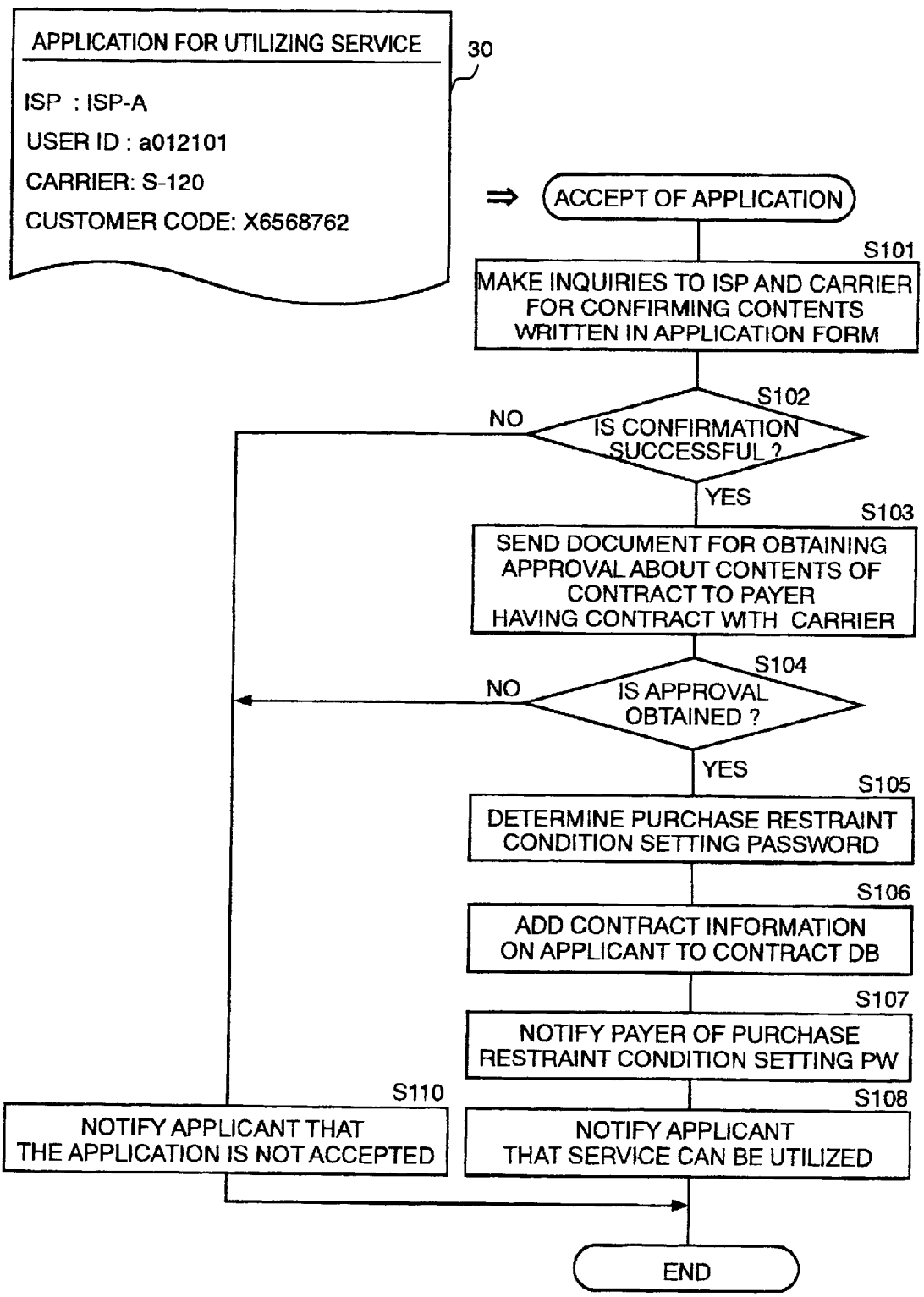

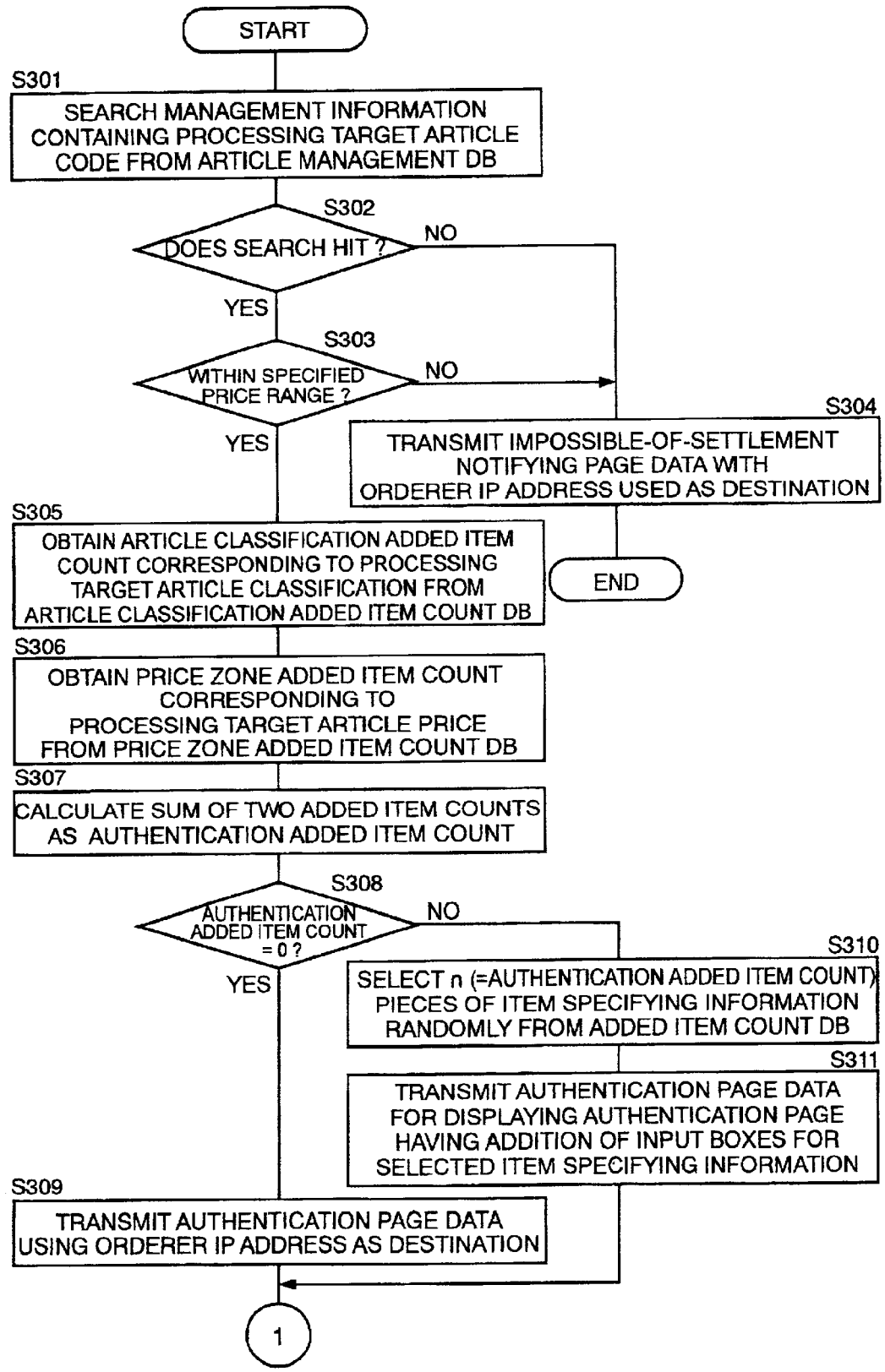

| | |
|---|---|
| TRANSACTION NUMBER | 12345678 |
| USER ID | a012101 |
| ARTICLE CODE | A012101 |
| PURCHASE PRICE | 12000 |
| CUSTOMER CODE | X6568762 |
| ACCOUNTED PARTY CODE | S-120 |
| ARTICLE SUPPLIER | BB1205 |
| ARTICLE STANDARD NAME | CONTENT A |
| ACCOUNT ITEM NAME | SERVICE A REGISTRATION FEE |

FIG. 24

```
                    BILL

CUSTOMER CODE:X6568762

COMMUNICATION FEE :              1200
  BASIC FEE :                      1000
  SERVICE A REGISTRATION FEE : 12000
  CONSUMPTION TAX :                 710
  TOTAL AMOUNT :                  14910
```
40

TRANSACTION MANAGEMENT SYSTEM AND PROGRAM FOR CONFIGURING ONLINE SHOPPING SYSTEM

BACKGROUND OF THE INVENTION

1. Field of the Invention

The present invention relates to a transaction management system for configuring an online shopping system and to a program used for a computer to function as a system for configuring the online shopping system.

The present disclosure relates to subject matter contained in Japanese Patent application No. 2000-157179 (filed on May 26, 2000), which is expressly incorporated herein by reference in its entirety.

2. Description of the Related Art

As broadly known, a variety of articles of trade have been sold through the Internet over the recent years. When purchasing an article, a specific process must be executed for paying a price of the article. Procedure of the process is different depending on an article supplier (dealer), however, the procedure can be roughly classified into a procedure requiring an input of a credit card number and a procedure requiring an input of unique pieces of information (such as a membership number, a password etc.) given to a user (member).

With an advancement of an SSL (Secure Sockets Layer) technology, though there decreases a possibility in which the credit card number inputted to a self-terminal leaks out (wiretapping) during a period till the credit card number arrives at a server of the article supplier, a problem arises, wherein the credit card number might be adversely used after arriving at the server. Therefore, on the occasion of purchasing the article dealt on the Internet, some users prefer not a payment by the credit card but a money transfer at a bank, a cash on delivery and so on, though the procedure becomes troublesome.

In the case of buying the article by inputting the membership number and the password, there does not arise the problem that the credit card number leaks out (this problem might, however, occur when obtaining the membership). The articles that can be purchased by inputting a couple of a certain membership number and a certain password are limited to those provided by the article supplier who gave this membership number. Therefore, in the case of obtaining various types of articles on the Internet, pieces of information on a multiplicity of members are obtained and must be managed so as not to be known by others. Further, in the case of purchasing the articles by use of those membership numbers, a problem is that a payment of each article must be done according to the membership number used.

Moreover, everybody can buy the articles on the Internet on a simple condition that he or she knows special pieces of information (the credit card number, the membership number etc.), so that there recently arises a problem that the infants get harmful articles on the Internet.

Under such circumstances, it is a primary object of the present invention to provide a transaction management system capable of configuring an online shopping system in which the user purchase the article without inputting the credit card number, and a necessity of managing new items of information for utilizing the system does not occur.

It is another object of the present invention to provide a transaction management system capable of configuring an online shopping system capable of restricting the articles that the users are allowed to purchase.

It is a further object of the present invention to provide a program executed by a computer to function as a system corresponding to each transaction management system.

SUMMARY OF THE INVENTION

To accomplish the above objects, according to one aspect of the present invention, a transaction management system comprises an authentication part for performing authentication by sending a user identifier and a password to an authentication system operated by an Internet service provider that should authenticate an accounting target user, and a request part for making an accounting request to an accounting processing system operated by other than the Internet service provider when the authentication part succeeds in the authentication.

With this transaction management system used, it is feasible to configure an online shopping system capable of purchasing an article of trade with the existing information (a user identifier and a password) and making one single accounting process system execute a settlement of some transactions.

For actualizing the transaction management system according to the present invention, the accounting process system may be operated by a type 1 carrier for collecting fees from a plurality of contractors. There may be selected the accounting process system that retains a unique piece of contractor identifier given to each of the plurality of contractors and state-of-contract information showing whether or not the contractor has a nonpayment of the fee. The transaction management system may further comprise a mapping-of-information storage part for storing a mapping of each of the plurality of user identifiers to at least one contractor identifier, an acquisition part for acquiring through communications the user identifier and the password given to a user by the Internet service provider from the user ordering a purchase of a certain article to any one of one or more purchase order accept system for accepting the order of purchasing the article through the communications, and the contractor identifier of the contractor made to pay a fee related to the article, and a judgement part for judging based on the state-of-contract information retained corresponding to the contractor identifier acquired by the acquisition part whether or not the contractor identified by the contractor identifier has the nonpayment of fee by exchanging information with the accounting process system. The authentication part may authenticate a user's identity on the basis of the user identifier and the password acquired by the acquisition part by exchanging information through communications with the authentication system if the user identifier and the contractor identifier acquired by the acquisition have their mapping given by the mapping information stored in the mapping-of-information storage part. The request part may request the type 1 carrier to collect a price of the article from the contractor identified by the contractor identifier by notifying, when the user identity is authenticated by the authentication part and when the judgment part judges that the contractor does not have any nonpayment of fee, the purchase order accept system accepting the purchase order from the user that the user's identity has been authenticated, and by notifying the accounting process system of the contractor identifier acquired by the acquisition part and of a price of the article ordered for its purchase.

Namely, the order accept system operated by the article supplier that conducts online dealing in linkage with the transaction management system of the present invention, does not authenticate by itself an identity of the orderer and request the transaction management system to authenticate the identity of the orderer. Note that this request may be given to the transaction management system either from the order accept system or from a computer terminal of the orderer.

The transaction management system recognizing that an order of purchasing a certain article of trade is issued to the purchase order accept system, acquires from the orderer through communications the user identifier and the password given to the orderer by an Internet service provider, and a contractor identifier of the contractor made to pay the fee related to the article concerned. That is, the transaction management system acquires these pieces of information not through the purchase order accept system but directly from the orderer.

Then, the transaction management system (the authentication part) accesses the accounting processing system and thereby judges whether the contractor (made corresponding to the orderer through the mapping of information) specified by the orderer, has a nonpayment of fee or not.

Further, the transaction management system (the request part) requests the authentication system operated by an ISP to authenticate the contractor's identity by use of the user identifier and the password acquired from the orderer. Then, the transaction management system (the request part), when the authentication system authenticate the identity and when judging that the contractor does not have any nonpayment of fee, notifies the purchase order accept system that the identity has been authenticated, and notifies the accounting process system of the contractor identifier and a price of the article. The accounting process system receiving this notification treats this notification as a request, made by the contractor identified by the notified contractor identifier, for collecting the (notified) price of the article, and a necessary process is executed.

Namely, according to the online shopping system utilizing this transaction management system, the orderer is able to purchase the article (including a contract for utilizing a service charged a fee) simply by inputting the information (the user identifier, the password) given from the ISP and the information (the contractor identifier) given from the type 1 carrier. That is to say, the orderer can purchase the article without inputting the credit card number. Further, it follows that the orderer can buy the article without managing a new item of information for utilizing (purchasing the article) the system. Moreover, a claim for payment of a purchase fee of the article is given from the type 1 carrier, and therefore the orderer is able to simultaneously make the payment to the type 1 carrier and the payment of the price of the article purchased. Furthermore, in the case of using the present transaction management system, it is confirmed that the contractor does not have any nonpayment of fee, and hence it is possible to configure the system with a low probability of occurrence of a transaction in which the fee of the article can not be collected.

For actualizing the transaction management system of the present invention in such a form as to aim at the accounting process system operated by the type 1 carrier, there may be selected the accounting process system that retains a unique piece of contractor identifier given to each of the plurality of contractors, a piece of state-of-contract information indicating whether or not the contractor has the nonpayment of fee, and plural pieces of attribute information for defining each of attributes of a plurality of categories with respect to the contractor. The acquisition part may acquire from the user pieces of information on the attributes of which the number corresponds to a price of the article ordered to be purchased, these attributes being selected at random from the attributes of the plurality of categories. The transaction management system may further comprise a judgement part for judging by exchanging the information with the accounting process system whether or not the information on the attributes of which the number corresponds to the price of the article that has been acquired by the acquisition part, is coincident with the attribute information on the same attributes that has been retained in the accounting process system. The request part may function when the judgement part judges that the information on the attributes of which the number corresponds to the price of the article that has been acquired by the acquisition part, is coincident with the attribute information on the same attributes that has been retained in the accounting process system.

Namely, the transaction management system may be constructed to authenticate the identity by making use of other items of information (an address, a telephone number etc. of the contractor) managed originally in the accounting process system operated by the type 1 carrier. If the transaction management system is thus constructed, it is feasible to configure the system with a less probability that the fee of the article can not be collected because of a mistake in authentication of the identity.

Further, the transaction management system of the present invention may further comprise a purchase condition information storage part stored with mappings of one or more pieces of purchase condition information for defining an attribute of the article to user identifiers different from each other, a judgement part for judging whether or not there is satisfied a purchase non-permission condition that the purchase condition information corresponding to the user identifier acquired by the acquisition part be stored in the purchase condition information storage part, and that the article ordered to be purchased does not have any attribute defined by the purchase condition information. The request part may function only when the judging part judges that the purchase non-permission condition is not satisfied.

With the thus constructed transaction management system used, it is possible to configure the online shopping system capable of restricting the article per orderer in terms of its attributes (category and an amount of money), which can be bought by this orderer.

In the case of constructing the transaction management system as described above, this transaction management system may further comprise a second password storage part stored with one or more second passwords corresponding respectively to one or more pieces of purchase condition information stored in the purchase condition information storage part, and a purchase condition information changing part for changing, when the same information as any one of the second passwords stored in the second password storage part, the purchase condition information corresponding to this second password into a piece of information corresponding to information that will be inputted thereafter.

If the transaction management system is thus constructed, it is feasible to configure the online shopping system in which the contractor (e.g., a parent of the orderer) is able to restrict the article in terms of the attributes (category and an amount of money), which can be bought by this orderer.

Further, the transaction management system of the present invention may further comprise a second name acquisition part for causing a computer terminal used by the user to display a name of the article ordered to be purchased and acquiring a second name used as a substitute for the name of the article from the user through the computer terminal. The request part, if notifying the purchase order accept system that the identity has been authenticated and when the second name has been acquired by the second name acquisition part, may notify the accounting process system of the second name together with the price, and may notify, when the second name has not been acquired by the second name acquisition part, the accounting process system of the name of the processing target article together with the price.

The online shopping system in which the orderer can specify the name shown in the bill can be configured by use of the thus constructed transaction management system and the accounting process system that creates a bill in which the information of which the request part notifies is used as a account item name, for the processing target article, of a bill for a contractor identified by the contractor identifier acquired by the acquisition part.

Moreover, in the transaction management system according to the present invention, the authentication system may be a system that retains a mapping of an e-mail address of each contract user to a user identifier of the same contract user. The transaction management system may further comprise a mail delivery part for delivering, if the request part notifies the purchase order accept system that the identity has been authenticated, an e-mail showing that the article has been purchased, with the e-mail address being used as a destination address, which is retained corresponding to the user identifier acquired by the acquisition part in the authentication system.

With the transaction management system thus constructed, when purchasing the article, the e-mail is delivered to the user having the user ID used for this purchase, and hence there can be obtained the system in which if the user ID, the password etc. leak out and are adversely used, the user himself or herself can immediately recognize this leakage.

According to another aspect of the present invention, a transaction management system for requesting a plurality of accounting process systems to execute accounting processes of fees, comprises a part for receiving a process request for an accounting request from a customer as a payer of fee, an acquisition part for acquiring identifying information of the accounting process system that is utilized by the fee payer on the basis of the process request received, and necessary items of information for authentication, and a part for requesting the accounting process system concerned to execute the accounting process of the fee on the basis of the information acquired by the acquisition part.

The online shopping system capable of selecting the accounting process system as a fee payee by using this transaction management system.

A program is structured so that a computer executes this program, thereby functioning as a system substantially equal to the transaction management system of the present invention. Accordingly, if using a system in which the program according to the present invention is installed into the computer, the online shopping system exhibiting the effects described above can be configured.

BRIEF DESCRIPTION OF THE DRAWINGS

These and other objects and advantages of the present invention will become clear from the following description with reference to the accompanying drawings, wherein:

FIG. 4 is an explanatory diagram showing an article management database provided in a transaction management system connected to the transaction management system in the embodiment;

FIG. 5 is an explanatory diagram showing an article classification added item count database provided in the transaction management system;

FIG. 6 is an explanatory diagram showing a price zone added item count database provided in the transaction management system;

FIG. 7 is an explanatory diagram showing an added item count database provided in the transaction management system;

FIG. 8 is an explanatory diagram showing a contract database provided in the transaction management system;

FIG. 9 is an explanatory diagram showing a contract procedure of utilizing a settlement service provided by the online shopping system;

FIG. 13 is a flowchart showing a process started when the transaction management system receives an accounting process request;

FIG. 24 is an explanatory diagram showing a bill created by the account management system.

DETAILED DESCRIPTION OF THE PREFERRED EMBODIMENTS

Embodiments of the present invention will hereinafter be described with reference to the accompanying drawings.

Figure 1:
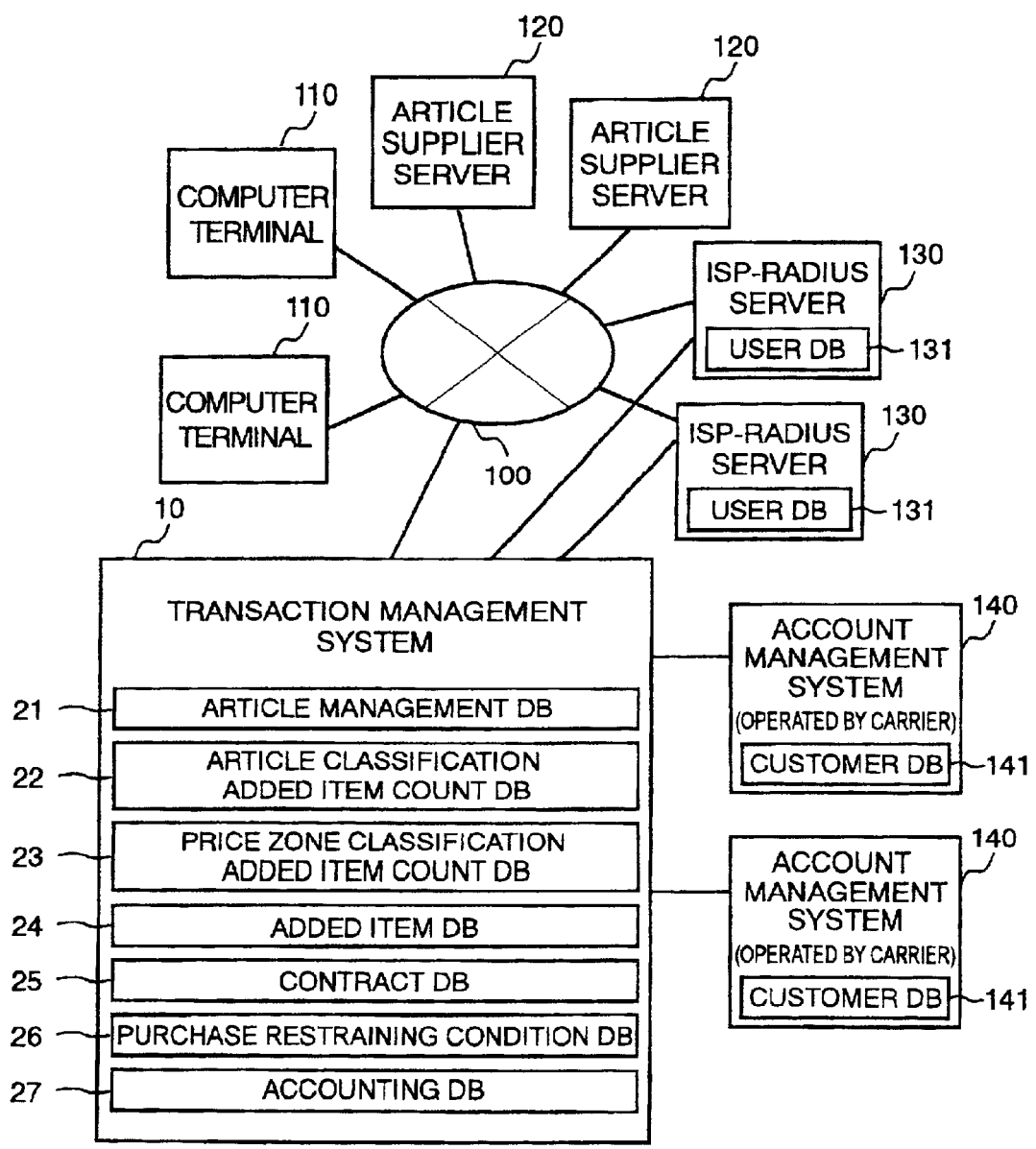
FIG. 1 is a diagram showing architecture of an online shopping system using a transaction management system in one embodiment of the present invention.

FIG. 1 shows architecture of an online shopping system using a transaction management system in one embodiment of the present invention. As shown in FIG. 1, the present online shopping system is configured by one or more computer terminals 110, one or more article supplier servers 120, one or more ISP-RADIUS servers 130, one or more account management systems 140, and a transaction management system 10 connected to these apparatuses via leased lines or the Internet 100.

Figure 2:
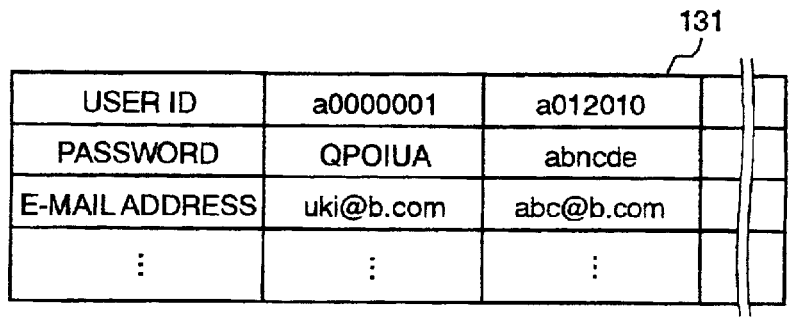
FIG. 2 is an explanatory diagram showing a user database provided in an ISP-RADIUS server connected to the transaction management system in the embodiment.

The ISP-RADIUS (Remote Authentication Dial-in User Service) server 130 is defined as a server operated by an ISP (Internet Service Provider) for providing Internet connection services based on a dial-up IP connection. The ISP-RADIUS server 130 includes a user database (user DB) 131 stored with, as schematically shown in FIG. 2, a user ID, a password, an e-mail address, etc. of each user having established a contract for utilizing the service. Further, the ISP-RADIUS server 130 incorporates a function of answering a variety of inquiries given from the transaction management system 10.

The article supplier server 120 is defined as a Web server for providing Web pages for dealing the article, and is operated by an article supplier. The article supplier server 120 configuring the present online shopping system is, though a detailed discussion will be given later on, structured to transmit, when receiving an order of the article of trade, to the transaction management system 10 an IP address of the computer terminal 110 used by a person who has issued this order and an accounting process request containing an article code, etc. of the article concerned.

Figure 3:
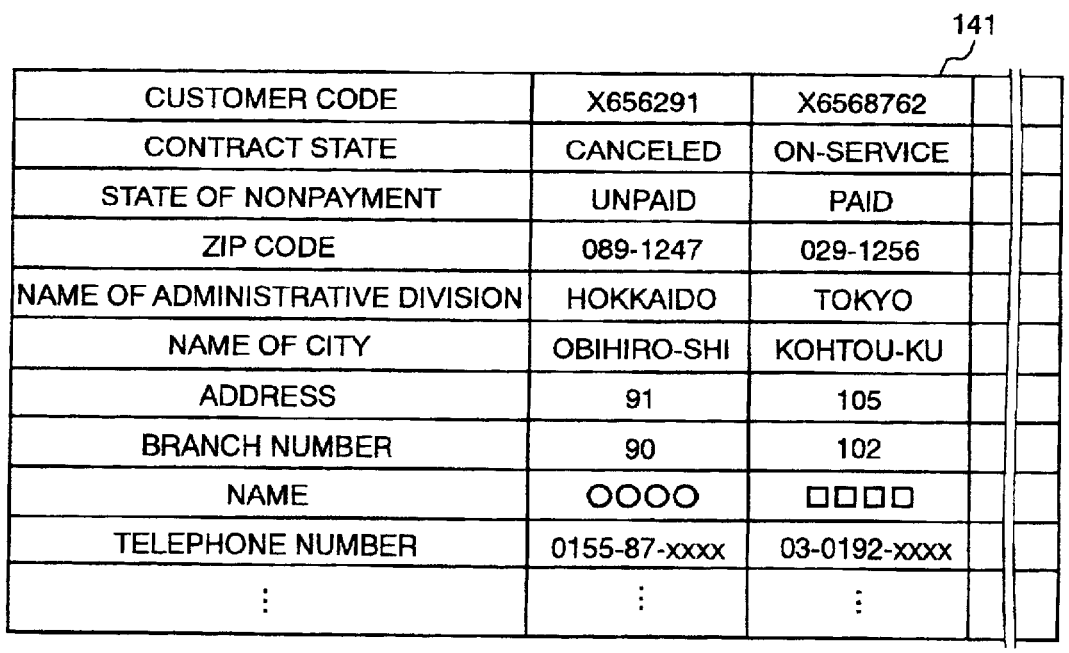
FIG. 3 is an explanatory diagram showing a customer database provided in a account management system connected to the transaction management system in the embodiment.

The account management system 140 is a system operated by a type 1 carrier (which will hereinafter simply called a carrier). The account management system 140 has a function of issuing bills for collecting fees charged for utilizing the communication services provided by the carrier from respective customers. The account management system 140 includes a customer database 141 stored with customer information consisting of, as schematically shown in FIG. 3, customer codes, pieces of information showing contract conditions (a state of the contract, a state of nonpayment) and various items of customer information (zip codes, names of the administrative divisions of Japan, and so on) of the respective customers having established the contracts with the carrier.

The basic operation of the account management system 140 configuring the present online shopping system is the same as that of the general account management system. The account management system 140 is, however, given a function of answering a variety of inquiries from the transaction management system 10. The account management system 140 is further given a function of reflecting a content of the accounting information containing the customer code in a content of the bill to the customer given this customer code.

The transaction management system 10 is a system actualized by installing a program developed for the present online shopping system into a computer. The transaction management system 10, when receiving the accounting process request transmitted by the article supplier server 120 after receiving the order of the article, obtains some categories of information for authenticating an identity of the person who has issued this order. Subsequently, the transaction management system 10 exchanges pieces of information with the ISP-RADIUS server 130 relative to the ISP with whom the orderer made the contract, and with the account management system 140 relative to the carrier with whom the orderer or a parent thereof made the contract, thereby attempting to authenticate the identity of the orderer on the basis of the information obtained. Then, if the identity of the orderer is authenticated, the transaction management system 10 functions so that the carrier with whom the orderer (or the parent thereof) made the contract collects fees of ordered articles together with a fee charged for the service provided by the carrier concerned. Further, the transaction management system 10 is structured to make the account management system 140 to issue a bill, in which not a name peculiar to the article but a name given by the orderer is written, as the item name of the ordered article.

For enabling this type of service (which will hereinafter be called a settlement service) to be provided, the transaction management system 10 is provided with an article management database 21, an article classification added item count database 22, a price zone added item count database 23, an added item database 24, a contract database 25, a purchase restraint condition database 26 and an accounting database 27.

When receiving the accounting process request, the transaction management system 10 functions with reference to six pieces of databases 21–26 excluding the accounting database 27. Therefore, before launching into a discussion on the essential function of the transaction management system 10, the databases 21–26 are to be described.

The article management database 21 provided in the transaction management system 10 is a database stared with, as shown in FIG. 4, plural sets of article management information consisting of an article code, an article standard name, a minimum price, a maximum price, an article classification, an article supplier code and a return destination address.

The article code of the article management information is a piece of article identifying information used for managing the article. The article standard name is an article name given by the article supplier (or a manufacturer of the article). The minimum price and the maximum price are pieces of information for defining a price range of the article of which a price might fluctuate. In the article management information on a normal article (with no fluctuation of its price), both of the minimum and maximum prices thereof may be considered coincident with a sales price of this article. The article classification is a piece of information used as an index for restricting purchasers of the article. The article supplier code is a piece of identifying information given to the article supplier dealing the article. The return destination address is defined as an IP address of the article supplier server 120 operated by the article supplier concerned.

The contents (data) in the article management database 21 are updated to retain the article management information on all the articles that are dealt by use of the transaction management system 10. Namely, when a contract agreed upon between a new article supplier and an administrator (that will be hereinafter termed a settler) of the transaction management system 10 about making a settlement using the present transaction management system 10, and when it is agreed upon that the article supplier having already established the contract sells a new article, a new item of article information is added to the article management database 21. Further, if a price of a certain article is changed under the minimum price or above the maximum price set about this article, the minimum or maximum price is changed.

The article classification added item count database 22 is a database stored with, as schematically shown in FIG. 5, an article classification added item count defined as numeric value information on each of the article classifications. Moreover, the price zone added item count database 23 is a database stored with, as schematically shown in FIG. 6, an price zone added item count with respect to an article price zone (a range defined by a lower limit price and an upper limit price). Though purposes of these added item counts will be mentioned later on, in the article classification added item count database 22, the article classification added item count is set for each of the article classifications so that a breadth of the range of the purchasers of the article coming under the corresponding article classification and the article classification add item count exhibit a negative correlation. Further, each price zone added item count is set in the price zone added item count database 23 so that the price zone added item count corresponding to the price zone becomes larger as the price zone increases as shown-in FIG. 6.

The added item database 24 is a database stored with, as schematically shown in FIG. 7, plural pieces of item specifying information ("zip code", "zip code 3-2", etc.) corresponding to a plurality of accounted party codes. The item specifying information,- corresponding to a certain accounted party code, stored in the added item database 24 is an item name itself ("zip code") of the information stored in the customer DB 141 in the account management system 140 that is identified by the accounted party code, or a piece of information ("zip code 3-2") containing two pieces of hyphenated numerical values subsequent to the item name. An application of the item specifying information will be explained later on. Note that the information is added to this added item database 24 when a contract is agreed upon between a new carrier and the settler about making a settlement using the transaction management system 10.

The contract database 25 is a database capable of, as shown in FIG. 8, storing plural sets of contract information each consisting of a user ID, a customer code, an ISP code, an accounted party code, and a purchase restraint condition setting password. The ISP code is defined as a piece of information given to the ISP and the ISP-RADIUS server 130.

Contract information is added to this contract database 25 when a service contract is established between an applicant for utilizing a settlement service and a settler.

To be specific, as schematically shown in FIG. 9, the applicant for utilizing this settlement service, to start with, submits to the settler an application form 30 for utilizing the service, in which an ISP name, a user ID, a carrier name, a customer code etc. are written.

The ISP name and the user ID that should be written in this application form 30 are related to the ISP with whom the service utilizing applicant makes the contract. The carrier name and the customer code are related to the carrier with whom the service utilizing applicant or a parent thereof (the head of a household) makes the contract. Note that if the service utilizing applicant (or the parent thereof) makes the contract with a plurality of carriers, the service utilizing applicant may make an application for utilizing the settlement service by writing the carrier names of two or more carriers and the customer codes.

The settler receiving a submission of this application form 30 inquires of the ISP identified by the ISP name written in the application form and of each carrier identified by the carrier name written in the application form for confirmation as to whether contents written in the application form 30 are correct (step S101).

Namely, the settler inquires of the ISP for confirming an existence of the contractor given the user ID written in the application form 30. Further, the settler inquires of the carrier for confirming an existence of the contractor given the customer code written in the application form 30. Note that the inquiry of the carrier is made, if the contractor given the above customer code exists, in the form of requesting the carrier to notify of a name, an address, etc. of the contractor with the same customer code.

If unable to confirm that the contents written in application form are correct, namely, if a negative answer to the inquiry is given from the ISP or the carrier (step S102; NO), the settler notifies the contract applicant of being unable to make a contract (step S110), and finishes the process for the application form 30 received.

Whereas if able to confirm that the contents written in the application form 30 are correct (step S102; YES), the settler sends to the payer a document for having a content of the application of the contract applicant confirmed (step S103).

Then, if an approval of the payer is obtained (step S104; YES), the contractor determines a purchase restraint condition setting password (step S105), and adds to the contract database 25 pieces of contract information consisting of the purchase restraint condition setting password and information corresponding to the information written in the application form 30 (step S106). If a plurality of carriers are specified in the application form 30, the settler adds to the contract database 25 plural items of contract information in which values set as the user ID, the ISP code and the restraint condition setting password are identical.

Thereafter, the contractor notifies the payer of the purchase restraint condition setting password (step S107), and also notifies the service utilizing applicant that the settlement service become utilizable (step S108), thereby finishing the process for the application form 30.

Figure 10:
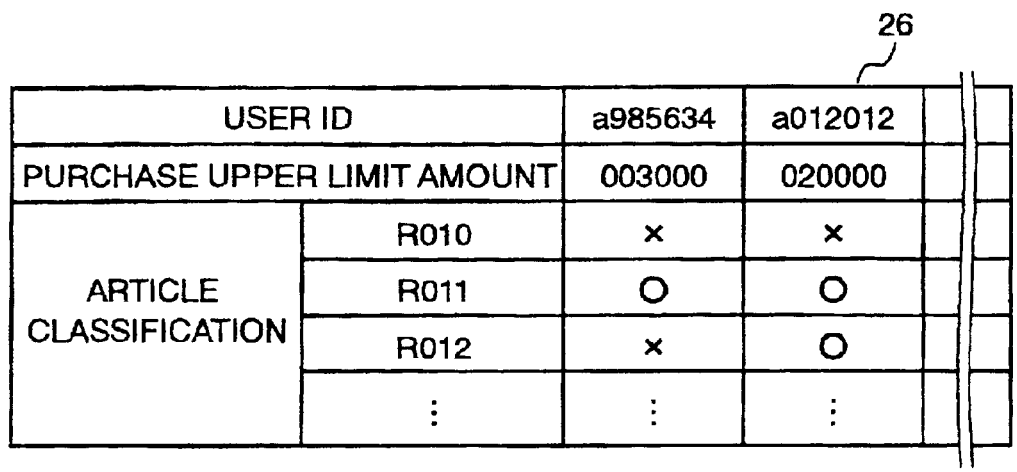
FIG. 10 is an explanatory diagram showing a purchase restraint condition database provided in the transaction management system.

The purchase restraint condition database 26 is a database for, as shown in FIG. 10, storing mappings, to the user ID, of a purchase upper limit amount for indicating an upper limit of the price of the article to which the user given this user ID is able to purchase and of information (shown in the form of X/o in FIG. 10) for indicating whether the order of the article in each article classification which is issued the user given the same user ID is rejected or not.

The transaction management system 10, based on an indication given from the payer with the purchase restraint condition setting password which the system 10 has been notified of, registers purchase restraint condition information (consisting of the user ID and a set of information corresponding thereto) in the purchase restraint condition database 26, or changes the purchase restraint condition information within the purchase restraint condition database 26.

Figure 11:
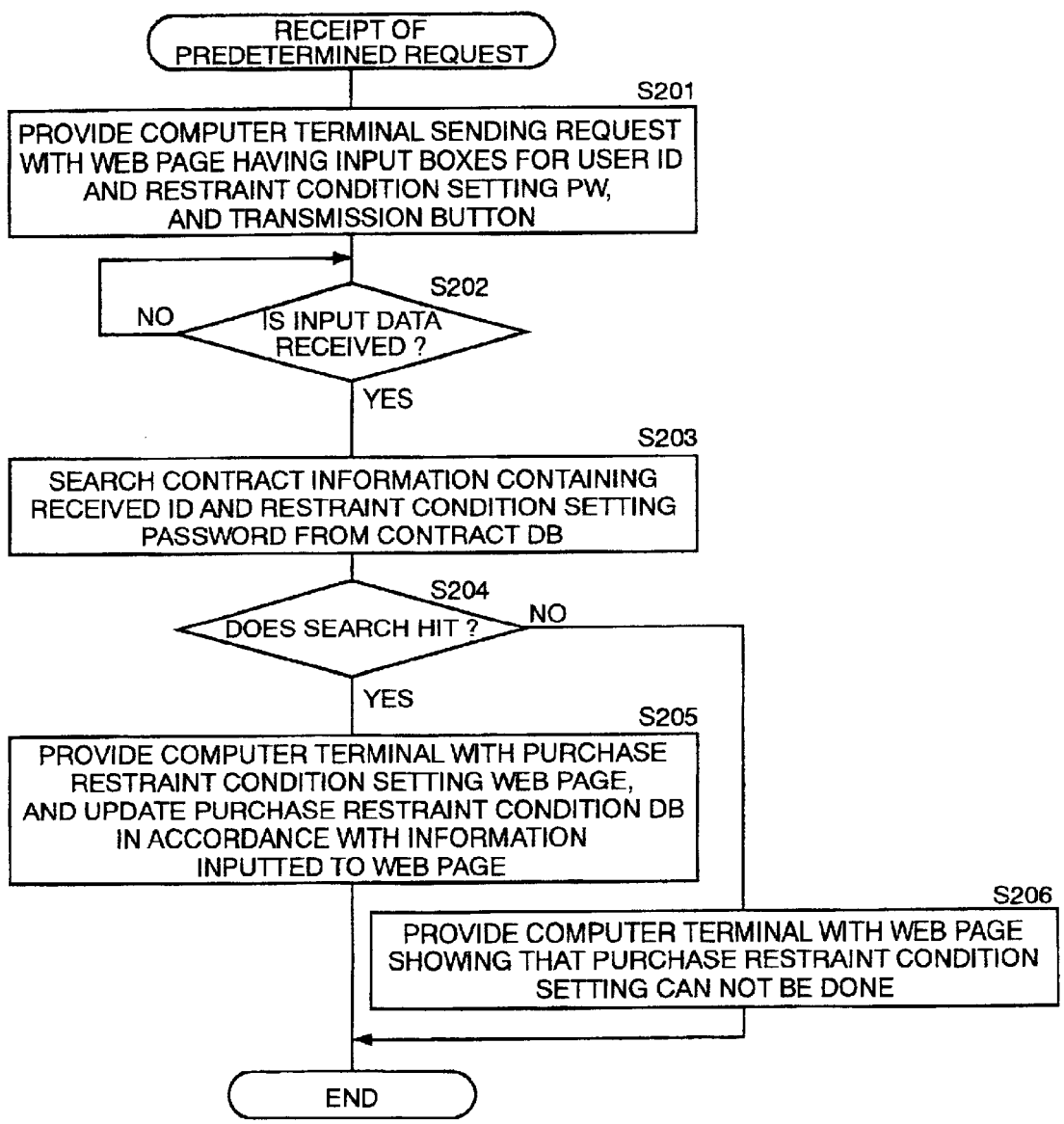
FIG. 11 is an explanatory flowchart showing a function of updating the purchase restraint condition database provided in the transaction management system.

More specifically, the transaction management system 10 incorporates a function that works in steps shown in FIG. 11. Namely, when receiving a predetermined HTTP (Hypertext Transfer Protocol) request, the transaction management system 10 provides the computer terminal 110 issuing this request with a Web page including input boxes for inputting the user ID and the purchase restraint condition setting PW and a transmission button for transmitting the information inputted in these input boxes to the transaction management system 10 (step S201). If receiving information transmitted as a result of an event that the transmission button on the Web page is pressed (step S202; YES), the transaction management system 10 searches from the contract database 25 the contract information in which the received user ID and purchase restraint condition setting PW are set (step S203).

If the search hits the contract information described above (step S204: YES), the transaction management system 10 provides the computer terminal 110 with a purchase restraint condition setting Web page including input boxes for inputting elements excluding the user ID of the purchase restraint condition information and a transmission button for transmitting information inputted to the input boxes to the transaction management system 10, and updates contents in the purchase restraint condition database 26 in accordance with the information transmitted by pressing the transmission button (step S205). Note that the transaction management system 10, if the purchase constraint condition information containing the user ID received in step S202 is stored the purchase restraint condition database 26 in step S205, provides the computer terminal 110 with the purchase restraint condition setting Web page on which initial values corresponding to the purchase restraint condition information are displayed in the input boxes. Then, the transaction management system 10 rewrites corresponding pieces of purchase restraint condition information in the purchase restraint condition database 26 in accordance with the information inputted to the Web page. Whereas if the purchase restraint condition information containing the user ID received is not stored in purchase restraint condition database 26, the transaction management system 10 provides the computer terminal 110 with the purchase restraint condition setting Web page in which the default values are displayed in the input boxes. Then, the transaction management system 10 adds to the purchase restraint condition database 26 the purchase restraint condition information consisting of the information inputted to the Web page and the user ID received.

Further, if the contract information containing the user ID received and the purchase restraint condition setting PW is not searched from the contract database 25 (step S204; NO), the transaction management system 10 provides the computer terminal 110 with a web page showing that the purchase restraint condition can not be set (step S206), and finishes the processing.

A function of the present online shopping system when an order of the article is received, will hereinafter be described.

The article supplier server 120 used in the present online shopping system, when receiving the order of the article, is structured to transmit a settlement request containing an IP address, an article code, a sales price and a accounted party code to the transaction management system 10.

Figure 12A:
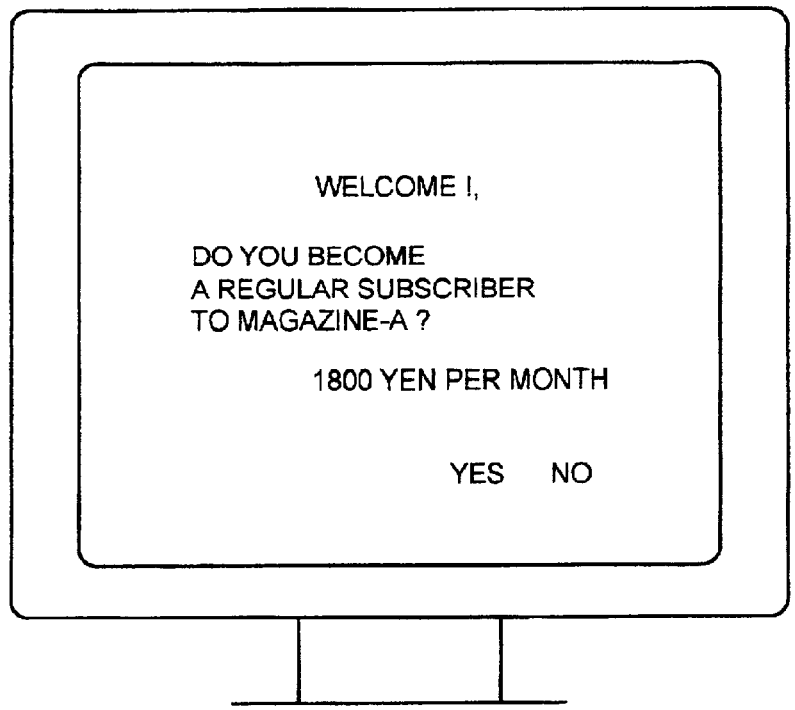
FIGS. 12A, 12B and 12C are explanatory diagrams each showing a Web page provided by an article supplier server connected to the transaction management system.
Figure 12B:
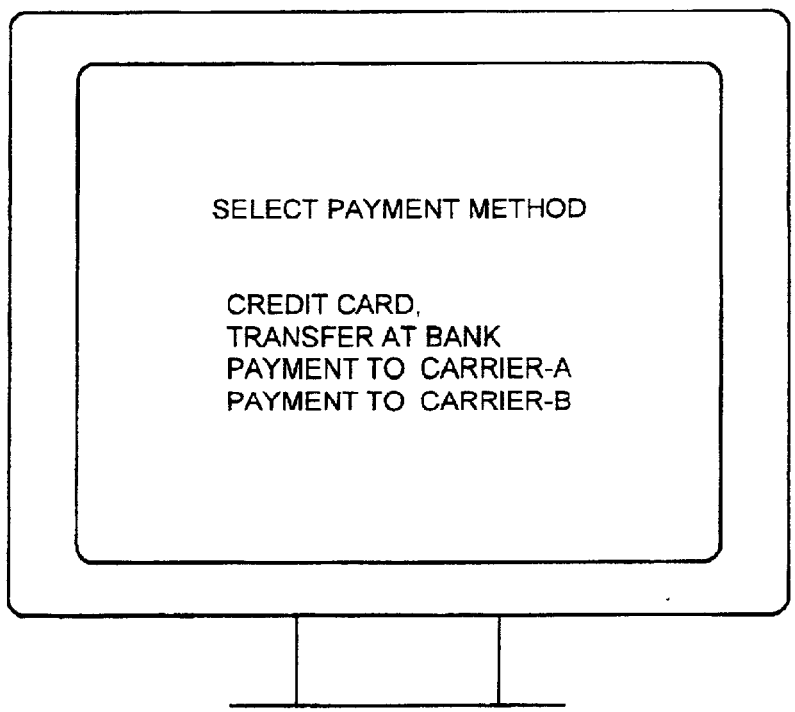
Figure 12C:
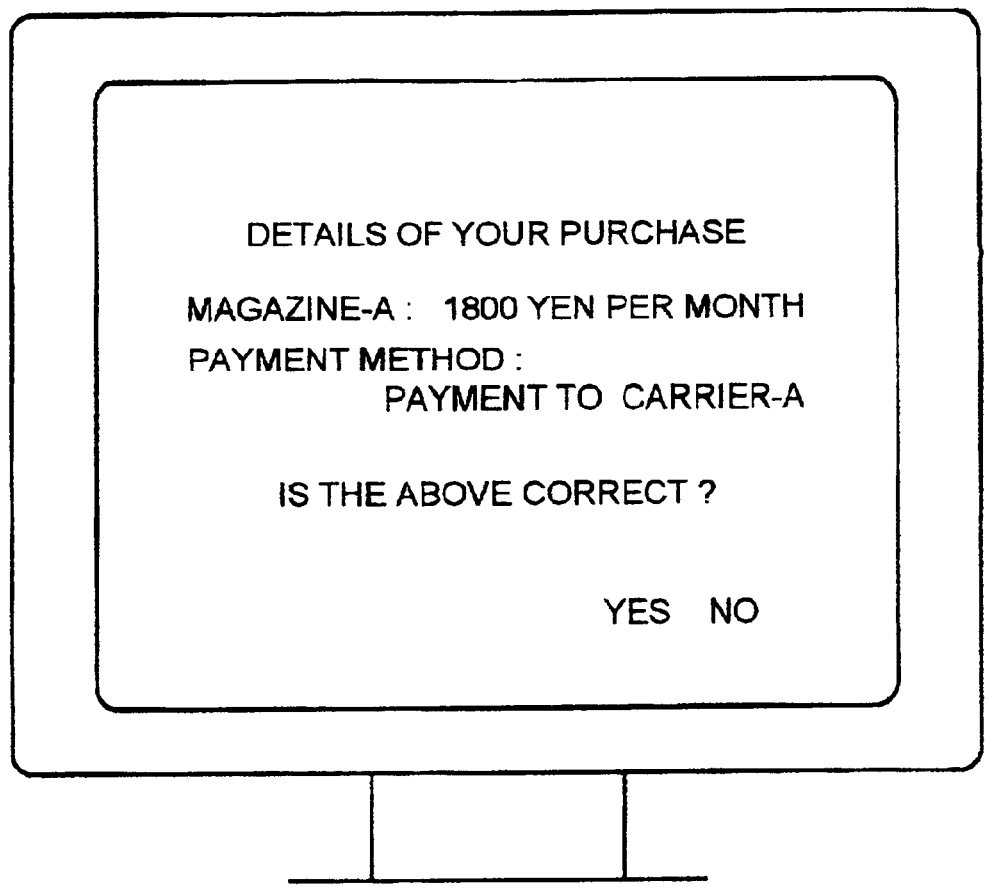

To be more specific, the article supplier server 120 is, corresponding to an event by the orderer, structured to sequentially display, for instance, Web pages as shown in FIGS. 12A, 12B and 12C on the display of the computer terminal 110. The article supplier server 120, when detecting an event that a "YES" button on the Web page shown in FIG. 12C (when receiving a request sent from the computer terminal 110 upon depressing the "YES" button), transmits a settlement request containing the IP address of the computer terminal 110, the article code of the article selected by the orderer, the sales price of the article and the accounted party code representing a carrier selected by the user.

Figure 14:
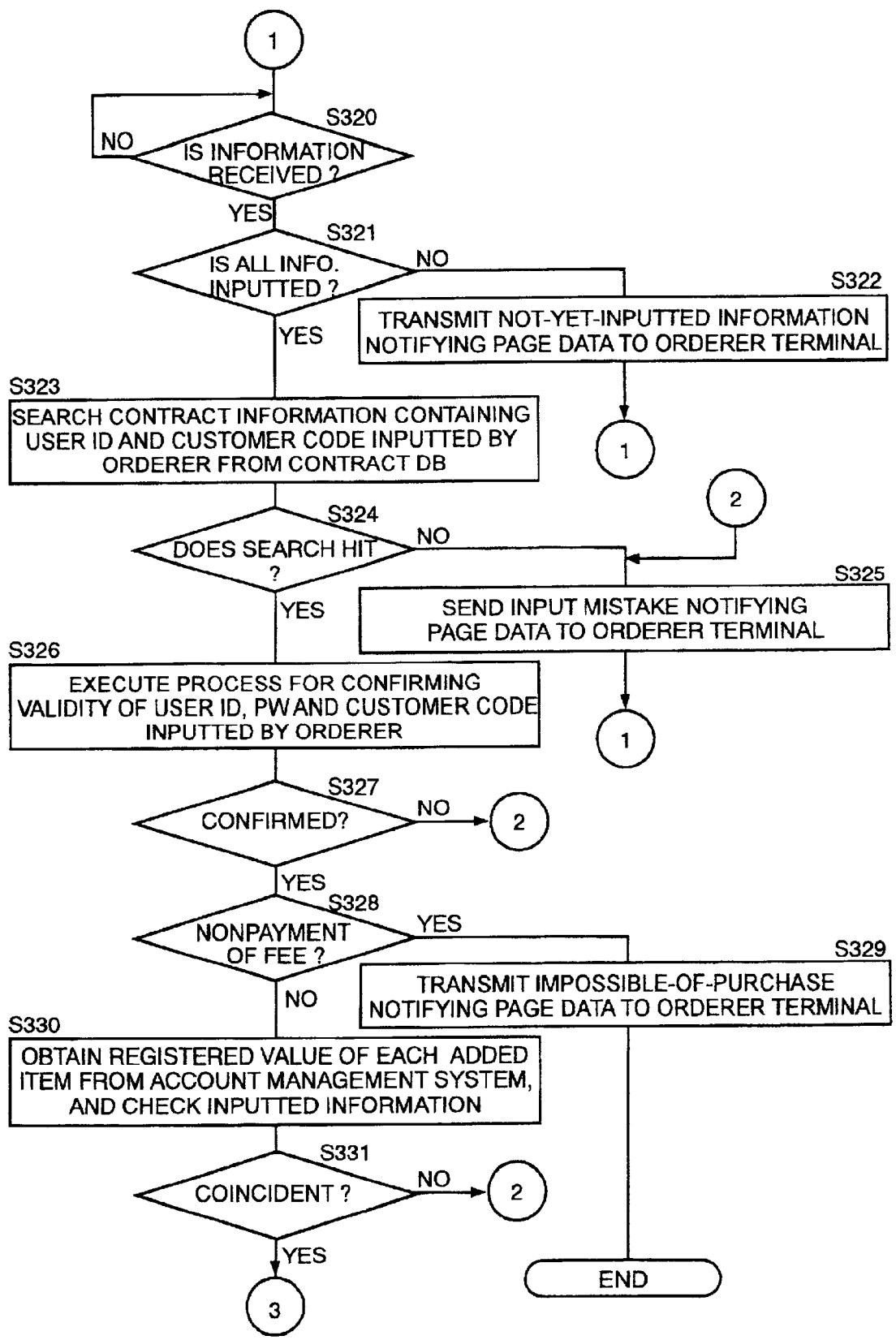
FIG. 14 is a flowchart continued from FIG. 13, showing the process started when the transaction management system receives the accounting process request.
Figure 15:
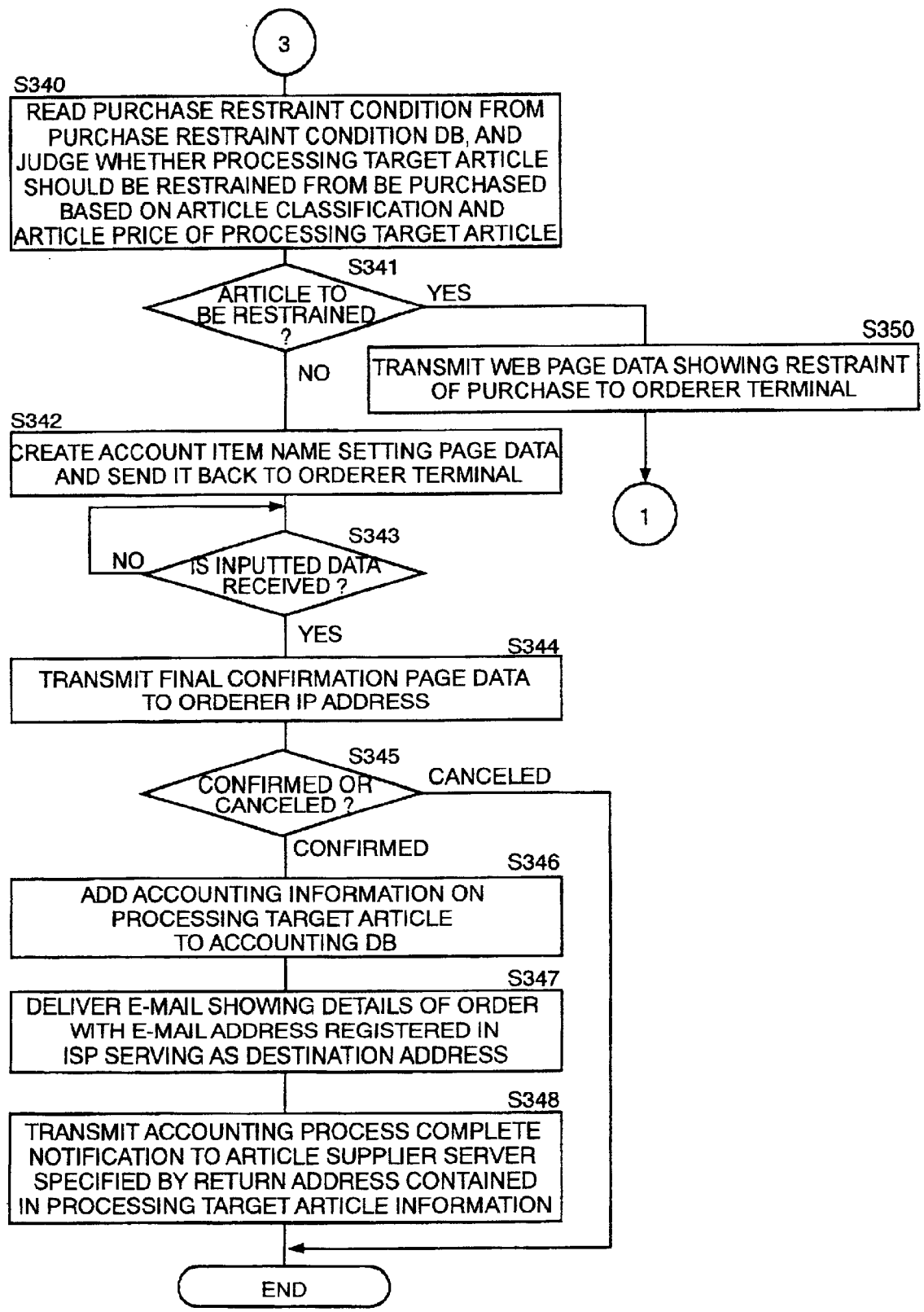
FIG. 15 is a flowchart continued from FIG. 14, showing the process started when the transaction management system receives the accounting process request.

The transaction management system 10 receiving this settlement request functions in steps shown in FIGS. 13 through 15.

That is, as shown in FIG. 13, the transaction management system 10, to begin with, searches from the article management DB 21 a piece of article management information in which the article code is coincident with an article code contained in the accounting process request (which will hereinafter be referred to as a processing target article code) (step S301).

If the search does not hit the article management information described above (step S302; NO), the transaction management system 10 sends an impossible-of-settlement notifying page data, wherein the IP address contained in the accounting process request (which will hereinafter be called an orderer IP address) is used as a destination address (step S304). Herein, the impossible-of-settlement page data may be defined as data for the computer terminal 110 (a Web browser) having received the same data to display a Web page indicating a message that the settlement can not be made. Then, the transaction management system 10 finishes the processing for the accounting process request received.

On the other hand, if the search hits the article management information containing the same article code as the processing target article code (step S302; YES), the transaction management system 10 judges whether or not a processing target sales price (contained in the accounting process request) falls within a specified price range defined by the minimum price and the maximum price (step S303). Then, if the processing target sales price does not fall within the specified price range (step S303; NO), the processing comes to an end after sending the impossible-of-settlement notifying page data in step S304. Note that the processing branches to "NO" in steps S302 and S303 in a case where some sort of trouble occurs in the system such as registering the article management DB 21 with the article management information containing erroneous contents and dealing an article with no registration of its article management information.

If the processing target sales price falls within the specified price range (step S303; YES), the transaction management system 10 reads an article classification added item count corresponding to the article classification contained in the processing target article management information from the article classification added item count DB 22 (step S305). Subsequently, the transaction management system 10 reads a price zone added item count corresponding to the processing target sales price from the price zone added item count DB 23 (step S306), and calculates a sum of these two counts as an authentication added item count (step S307).

If the calculated authentication added item count is "0" (step S308; YES), the transaction management system 10, with the orderer IP address used as a destination address, transmits an identity authentication page data used for the Web browser to display an identity authentication page containing the input boxes for inputting the user ID, the password and the customer code, and the transmission button (step S309).

Whereas if the calculated authentication added item count is not "0" (step S308; NO), the transaction management system 10 selects at random one or more pieces of item specifying information, the number of which coincides with the authentication added item count, from pieces of item specifying information stored as a mapping to the accounted party code in the processing target article management information in the added item DB 24 (step S310). Subsequently, the transaction management system 10, with the orderer IP address used as a destination address, transmits the identity authentication page data used for the Web browser to display an identity authentication page having an added input box for inputting a piece of information specified by each of the selected pieces of item specifying information (step S311).

Figure 16:
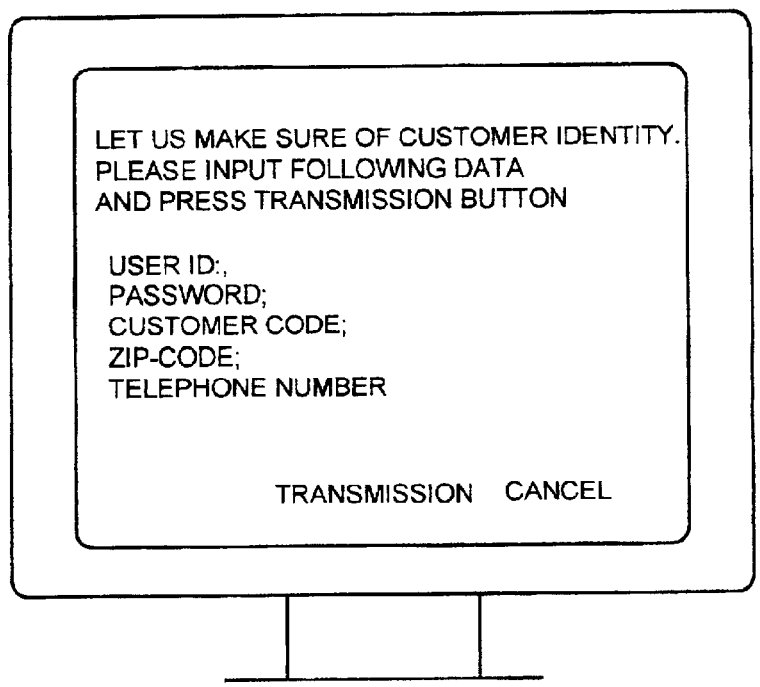
FIGS. 16~21 are explanatory diagrams each showing a Web page provided by the transaction management system to a computer terminal.

Namely, the transaction management system 10, if the calculated authentication added item count is, e.g., "2", transmits such an identity authentication page data that the identity authentication page as shown in FIG. 16 is displayed on the display of the computer terminal 110 on which the web page as shown in FIG. 12C has been displayed. Note that if the item specifying information selected in step S310 is "zip code 3-2", in step S311, the transaction management system 10 creates and transmits such an data that an identity authentication page having an addition of an input box for inputting a numeric value for 3 through 2 digits of the zip code comes to be displayed.

Figure 17:
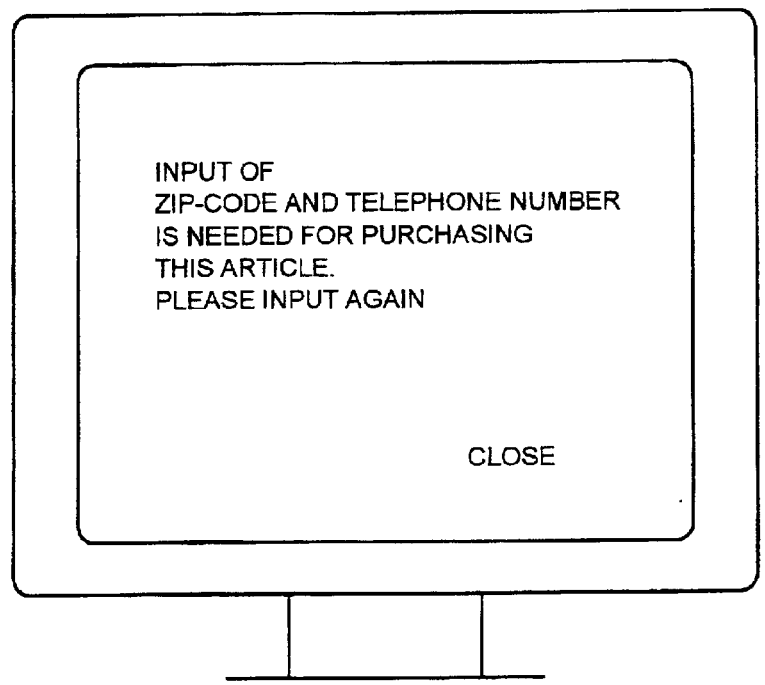

In the case of receiving the orderer input information transmitted by pressing the transmission button on the identity authentication page and containing the information inputted to the input boxes (FIG. 14: step S320; YES), the transaction management system 10 judges from the contents of the orderer input information whether or not the orderer inputs all pieces of information (step S321). If there is the information that is not inputted (step S321; NO), the transaction management system 10 transmits the data for displaying a Web page for prompting the orderer to input the information that is not yet inputted to the computer terminal 110 having transmitted the orderer input information (which will hereinafter be called an orderer terminal) (step S322). Namely, the transaction management system 10 transmits in step S322 such an item of data that the Web page as shown in FIG. 17 is displayed on the orderer terminal.

Thereafter, the transaction management system 10 returns to step S320 and, when receiving the orderer input information, starts the processing from step S321 (more precisely, the transaction management system 10 waits in an unillustrated step for receiving various pieces of information (HTTP request) containing the orderer input information, and, when the received information is the orderer input information, starts the process from step S321).

If all pieces of information are inputted (step S321; YES) the transaction management system 10 searches from the contract DB 25 the contract information containing the user ID and the customer code inputted by the orderer (step S323). If the search does not hit the contract information described above (step S324; NO), the transaction management system 10 transmits to the orderer terminal input mistake notifying page data for the browser to display a Web page showing that an erroneous piece of information is inputted (step S325).

If the contract information containing the user ID and the customer code inputted by the orderer can be searched from the contract DB 25 (step S324; YES), the transaction management system 10 executes a process for confirming that the user ID, the password and the customer code inputted by the orderer are correct with reference to the contract information searched (step S326). To be specific, the transaction management system 10 inquires of the ISP-RADIUS server 130 corresponding to the ISP code contained in the searched contract information about whether or not the user ID, the password inputted by the orderer are related to the user as a contractor. At the same time, the transaction management system 10 inquires of the account management system 140 corresponding to the accounted party code contained in the searched contract information about whether or not the customer code inputted by the orderer is related to the customer as a contractor. Further, when the orderer proves to be a contractor of the account management system 140, the transaction management system 10 inquires about whether or not the orderer concerned has a nonpayment of fee and so on.

Then, if any one of or neither validity of the user ID and the password inputted by the orderer nor validity of the customer code can be confirmed (step S327; NO), the transaction management system 10 goes forward to step S325. Then, the transaction management system 10, after transmitting the input mistake notifying page data to the orderer terminal, waits for inputting again the information to the identity authentication page.

Figure 18:
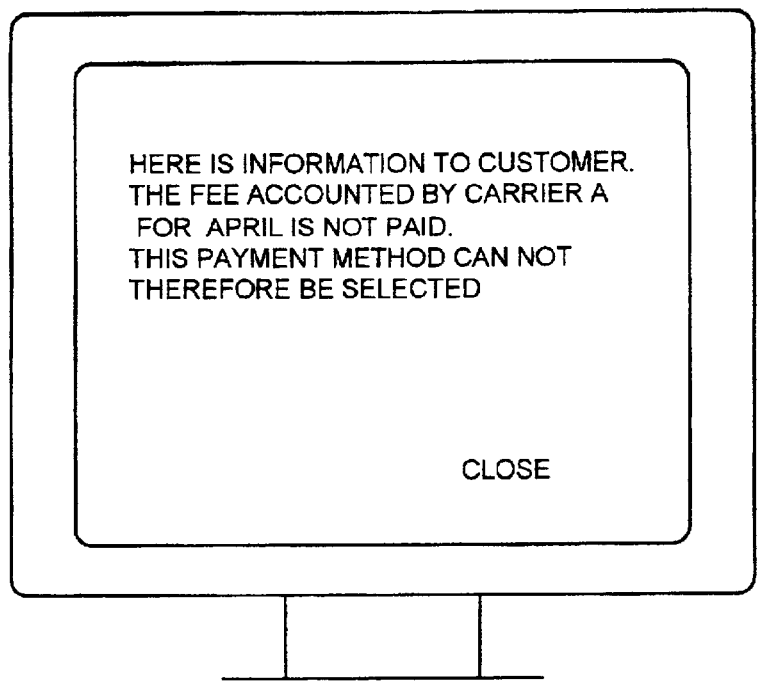

If the orderer proves, though it can be confirmed that the user ID, etc. is valid (step S327; YES), to have a nonpayment of fee and so on (step S328; YES), the transaction management system 10 transmits an impossible-of-purchase notifying page data used for the browser to display the Web page as shown in FIG. 18 (step S329), and finishes the process for the accounting process request.

Whereas if the orderer does not have the nonpayment of fee and so on (step S328; NO), the transaction management system 10 reads the information on the respective added items in the input boxes added to the identity authentication page from the customer DB 141 of the account management system 140, and judges whether or not all pieces of information set in the input boxes on the identity authentication page are correct (step S330). Then, if unable to confirm that the information set by the orderer with respect to the added items is correct (step S331; NO), the transaction management system 10 transmits the input mistake notifying page data to the orderer terminal (step, S325), and thereafter waits for inputting again the information to the identity authentication page.

Whereas if it can be confirmed that the information inputted with respect to the added items is correct (step S331; YES), the transaction management system 10, as shown in FIG. 15, reads the purchase restraint condition information containing the processing target user ID from the purchase restraint condition DB 26, and judges based on the readout purchase restraint condition information and an article classification and an article price of the processing target article (identified by the processing target article code) whether or not the processing target article falls into a category of an article that should be restrained from being purchased by the orderer (step S340). Note that the purchase restraint condition information containing the processing target user ID does not exist in the database, the transaction management system 10 judges that the processing target article is not the article that should be restrained from being purchased.

Figure 19:
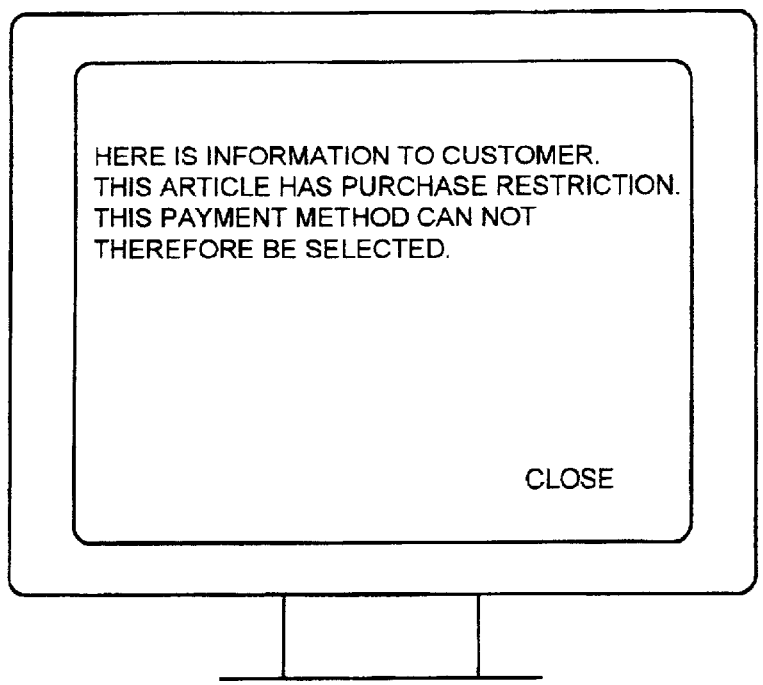

If the processing target article falls into the category of the article that should be restrained from being purchased (step S341; YES), the transaction management system 10 transmits to the orderer terminal the data for having a Web page showing this purport displayed (step S350). Namely, the transaction management system 10 makes the orderer terminal (browser) display the Web page as shown in FIG. 19.

Whereas if the processing target article does not fall into the category of the article that should be restrained from being purchased (step S341; NO), the transaction management system 10 creates data for displaying a account item name setting page by use of an article standard name of the processing target article, and sends the same data to the orderer terminal (step S342).

Figure 20:
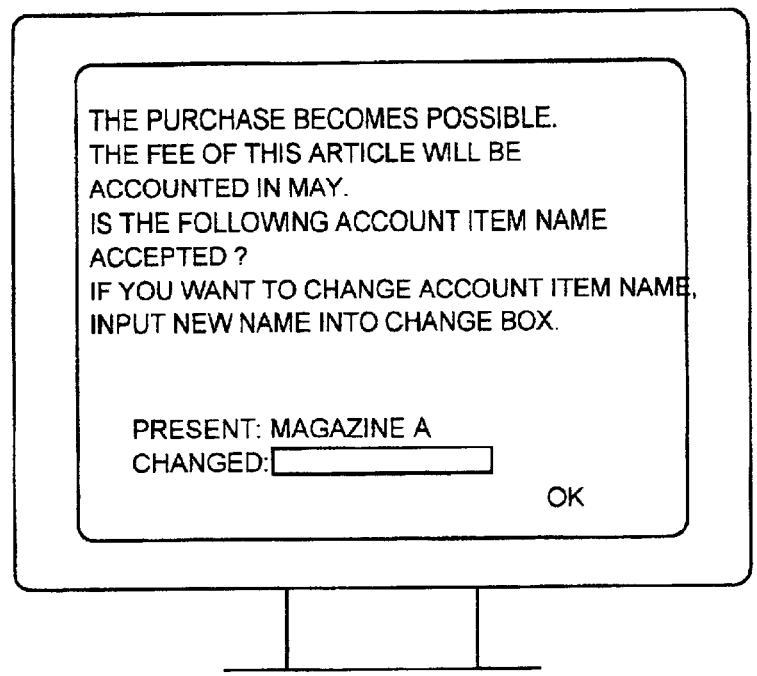

As schematically illustrated in FIG. 20, the article standard name ("MAGAZINE A") of the processing target article is shown in the account item name setting page. The account item name setting page has an input box (provided on the right side of "CHANGED" for inputting a account item name and an "OK" button for transmitting the information containing the account item name inputted to this input box.

Figure 21:
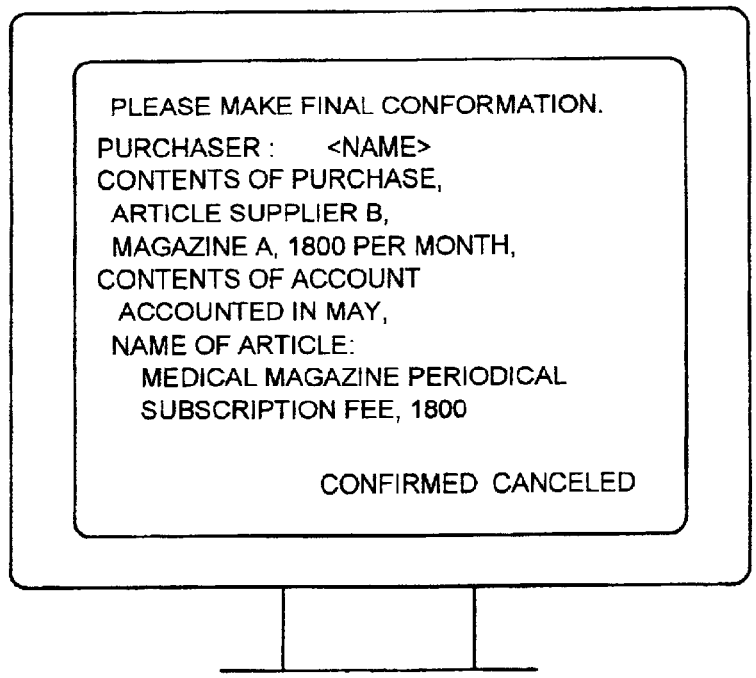

When receiving the information transmitted by pressing the "OK" button on the account item name setting page (step S343; YES), the transaction management system 10 transmits to the orderer terminal a piece of data for displaying a final confirmation page (step S344). For example, if "MEDICAL MAGAZINE PERIODICAL SUBSCRIPTION FEE" is set as a account item name on the account item name setting page shown in FIG. 20, the transaction management system 10 makes the orderer terminal display, as shown in FIG. 21, a final confirmation Web page showing that a name such as "MEDICAL MAGAZINE PERIODICAL SUBSCRIPTION FEE" will be used. Note that if the orderer inputs nothing but presses the "OK" button on the account item name setting page shown in FIG. 20, the final confirmation page showing "MAGAZINE A" in place of "MEDICAL MAGAZINE PERIODICAL SUBSCRIPTION FEE", is displayed on the display of the orderer terminal.

When detecting an event that a cancel button on the final confirmation page is pressed (step. S345; canceled), the transaction management system 10 executes nothing particular and finishes the process for the accounting process request.

Figures 22, 23:
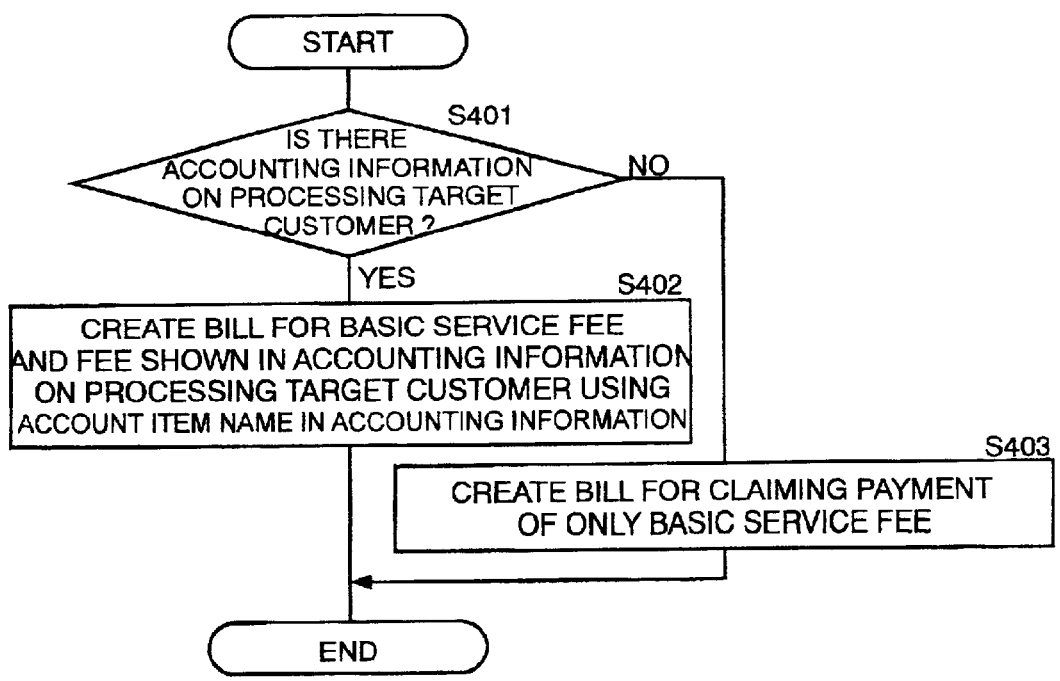
FIG. 22 is an explanatory diagram showing an accounting database provided in the transaction management system.
FIG. 23 is an explanatory diagram showing a function of the account management system connected to the transaction management system.

While on the other hand, when getting the final confirmation, namely, when receiving the information implying that the confirmation button is pressed (step S345; confirmed), the transaction management system 10 determines a transaction number given to a transaction with the confirmation obtained, and adds pieces of accounting information on the processing target article to the accounting DB 27 for storing, as shown in FIG. 22, the accounting information consisting of a transaction number, a user ID, an article code, an article price, a customer code, a accounted party code, an article supplier code, an article standard name and an account item name (step S346).

Subsequently, the transaction management system 10 delivers an e-mail containing the contents of the processed executed, wherein an e-mail address registered in the ISP is used as a destination address (step S347). Then, the transaction management system 10 transmits an accounting process complete notification containing the transaction number, the article code, the price and the orderer IP address, wherein a return destination address in the article target management information serves as a destination address (step S348) That is, the transaction management system 10 transmits the accounting process complete notification to the article supplier server 120 identified by the return destination address in the processing target contract information, and comes to an end of the processing.

The article supplier server 120 receiving this accounting process complete notification, with the orderer IP address contained in this notification being used as a destination address, transmits data for displaying a Web page showing that the procedure is ended. Further, the transaction management system 10 stores the transaction number, the article code and the price in the database for managing an article dealing condition, which is provided in the system 10 itself, and manages a procedure of delivering the actual article and also a receipt of money by use of the information in this database.

Moreover, the transaction management system 10 periodically executes a process of notifying the account management system 140, identified by the accounted party code, of the accounting information (not yet notified) containing the same accounted party code that is stored in the accounting DB 27.

Then, each account management system 140 executes the process as by the steps shown in FIG. 23 when creating a bill give to each customer.

At first, it is judged whether or not the notification of the accounting information on the processing target customer is received (step S401). Then, if the notification of the accounting information on the processing target customer is not received (step S401; NO), the account management system 140 creates a bill for claiming only a fee charged for the self-provided service (step S403). Whereas it the notification of the accounting information on the processing target customer is received, the account management system 140 creates a bill for claiming a fee for the self-provided service and a price of the article related to the accounting information on the processing target customer (steps 402). On this occasion, the account management system 140 uses the account item name contained in the accounting information as a name of this article. To be specific, the account management system 140 creates a bill 40 as shown in FIG. 24 with respect to a customer identified by a customer code X6568762 contained in the 25 accounting information stored in the accounting DB 27 shown in FIG. 22.

Thereafter, the thus created bill is mailed, and the carrier collects the fee from the respective customers. Then, necessary settlements are conducted between each carrier and the settler and between the settler and each article supplier. Namely, each carrier pays the settler a fee equivalent to the price of the article (which is an amount of money with a commission subtracted) out of the fee collected from the customer. The settler subtracts the commission and shares a profit corresponding to an amount of money gained for sales to each article supplier.

As discussed above in depth, according to the present online shopping system, the purchaser of the article can buy the article without inputting a credit card number and can therefore enjoy shopping on the Internet without any anxiety for an adverse use of the credit card number. Further, the purchaser is able to pay batchwise all the prices of the variety of articles purchased from the plurality of article suppliers, and does not therefore feel troublesome with no necessity of paying to the individual providers. Moreover, the article supplier is released from the time-consuming operations of authenticating the customer identity and collecting the fees, and the carrier may emphasize the advantage that the fee for the Internet shopping can be simply paid, with the result that the number of customers increases.

Furthermore, even when buying the articles from the multiplicity of article suppliers, not each of the article suppliers but only the transaction management system 10 is notified of the user ID, the password, the customer code etc. that must be inputted for conducting the shopping, and hence these unique pieces of information do not spread unnecessarily. Further, when the dealing is carried out, an e-mail is delivered to the e-mail address registered in the ISP, and it therefore follows that the authentic owner of the user ID can immediately discover that an illegal purchase takes place.

Moreover, the restraint condition setting password is delivered to the party establishing the contract with the carrier, so that, for instance, a juvenile will buy an article on the Internet in such a form that the parent restricts the categories of the articles he or she is allowed to get.

Note that the transaction management system 10 in the embodiments discussed above may be modified in a variety of forms. For example, the transaction management system 10, though it receives the accounting process request from the article supplier server 120, may receive a request corresponding to the accounting process request from the computer terminal 110 (the article supplier server 120 may provide the computer terminal 110 with a Web page including a button through which the above request is to be transmitted).

What is claimed is:

1. A transaction management system comprising:

an authentication part for performing authentication by sending a user identifier and a password to an authentication system operated by an Internet service provider that should authenticate an accounting target user; and a request part for making an accounting request to an accounting processing system operated by other than said Internet service provider when said authentication part succeeds in the authentication, wherein said accounting process system is a system operated by a type 1 carrier for collecting fees from a plurality of contractors, and retaining a unique piece of contractor identifier given to each of the plurality of contractors and state-of-contract information showing whether or not the contractor has a nonpayment of the fee;

said transaction management system further comprises: a mapping-of-information storage part for storing a mapping of each of the plurality of user identifiers to at least one contractor identifier; an acquisition part for acquiring through communications the user identifier and the password given to a user by said Internet service provider from the user ordering a purchase of a certain article to any one of one or more purchase order accept system for accepting the order of purchasing the article through the communications, and the contractor identifier of the contractor made to pay a fee related to the article; and a judgement part for judging based on the state-of-contract information retained corresponding to the contractor identifier acquired by said acquisition part whether or not the contractor identified by the contractor identifier has the nonpayment of fee by exchanging information with said accounting process system;

said authentication part authenticates a user's identity on the basis of the user identifier and the password acquired by said acquisition part by exchanging information through communications with said authentication system if the user identifier and the contractor identifier acquired by said acquisition have their mapping given by the mapping information stored in said mapping-of-information storage part; and said request part requests said type 1 carrier to collect a price of the article from the contractor identified by the contractor identifier by notifying, when the user identity is authenticated by said authentication part and when said judgment part judges that the contractor does not have any nonpayment of fee, said purchase order accept system accepting the purchase order from the user that the user's identity has been authenticated, and by notifying said accounting process system of the contractor identifier acquired by said acquisition part and of a price of the article ordered for its purchase.

2. A transaction management system according to claim 1, wherein:

said accounting process system retains a unique piece of contractor identifier given to each of the plurality of contractors, a piece of state-of-contract information indicating whether or not the contractor has the nonpayment of fee, and plural pieces of attribute information for defining each of attributes of a plurality of categories with respect to the contractor;

said acquisition part acquires from the user pieces of information on the attributes of which the number corresponds to a price of the article ordered to be purchased, these attributes being selected at random from the attributes of the plurality of categories;

said transaction management system further comprises a judgement part for judging by exchanging the information with said accounting process system whether or not the information on the attributes of which the number corresponds to the price of the article that has been acquired by said acquisition part, is coincident with, the attribute information on the same attributes that has been retained in said accounting process system; and said request part functions when said judgement part judges that the information on the attributes of which the number corresponds to the price of the article that has been acquired by said acquisition part, is coincident with the attribute information on the same attributes that has been retained in said accounting process system.

3. A transaction management system according to claim 1, further comprising:

a purchase condition information storage part stored with mappings of one or more pieces of purchase condition information for defining an attribute of the article to user identifiers different from each other; and a judgement part for judging whether or not there is satisfied a purchase non-permission condition that the purchase condition information corresponding to the user identifier acquired by said acquisition part be stored in said purchase condition information storage part, and that the article ordered to be purchased does not have any attribute defined by the purchase condition information, wherein said request part functions only when said judging part judges that the purchase non-permission condition is not satisfied.

4. A transaction management system according to claim 3, further comprising:

a second password storage part stored with one or more second passwords corresponding respectively to one or more pieces of purchase condition information stored in said purchase condition information storage part; and a purchase condition information changing part for changing, when the same information as any one of the second passwords stored in said second password storage part, the purchase condition information corresponding to this second password into a piece of information corresponding to information that will be inputted thereafter.

5. A transaction management system according to claim 1, further comprising:

a second name acquisition part for causing a computer terminal used by the user to display a name of the article ordered to be purchased and acquiring a second name used as a substitute for the name of the article from the user through said computer terminal, wherein:

said request part, if notifying said purchase order accept system that the identity has been authenticated and when the second name has been acquired by said second name acquisition part, notifies the accounting process system of the second name together with the price, and notifies, when the second name has not been acquired by said second name acquisition part, said accounting process system of the name of the processing target article together with the price; and said accounting process system creates a bill in which the information of which said request part notifies is used as an account item name, for the processing target article, of a bill for a contractor identified by the contractor identifier acquired by said acquisition part.

6. A transaction management system according to claim 1, wherein:

said authentication system is a system that retains a mapping of an e-mail address of each contract user to a user identifier of the same contract user; and said transaction management system further comprises a mail delivery part for delivering, if said request part notifies said purchase order accept system that the identity has been authenticated, an e-mail showing that the article has been purchased, with the e-mail address being used as a destination address, which is retained corresponding to the user identifier acquired by said acquisition part in said authentication system.

\* \* \* \* \*

UNITED STATES PATENT AND TRADEMARK OFFICE
CERTIFICATE OF CORRECTION

PATENT NO. : 6,941,363 B2
APPLICATION NO. : 09/864171
DATED : September 6, 2005
INVENTOR(S) : Hirokazu Ito et al.

It is certified that error appears in the above-identified patent and that said Letters Patent is hereby corrected as shown below:

On the Title Page (56)
First Page, Column 2 (Other Publications), Line 1, delete "business" and insert -- businesses, -- therefor.

First Page, Column 2 (Primary Examinar), Line 1, after "Chilcot" insert -- , Jr. --.
Column 18, Line 7, after "with" delete ",".

Signed and Sealed this

Fifth Day of September, 2006

JON W. DUDAS
*Director of the United States Patent and Trademark Office*